May 31, 1938.   J. W. McCAFFREY   2,119,110
TREATMENT OF HYDROCARBON OILS
Filed July 10, 1934
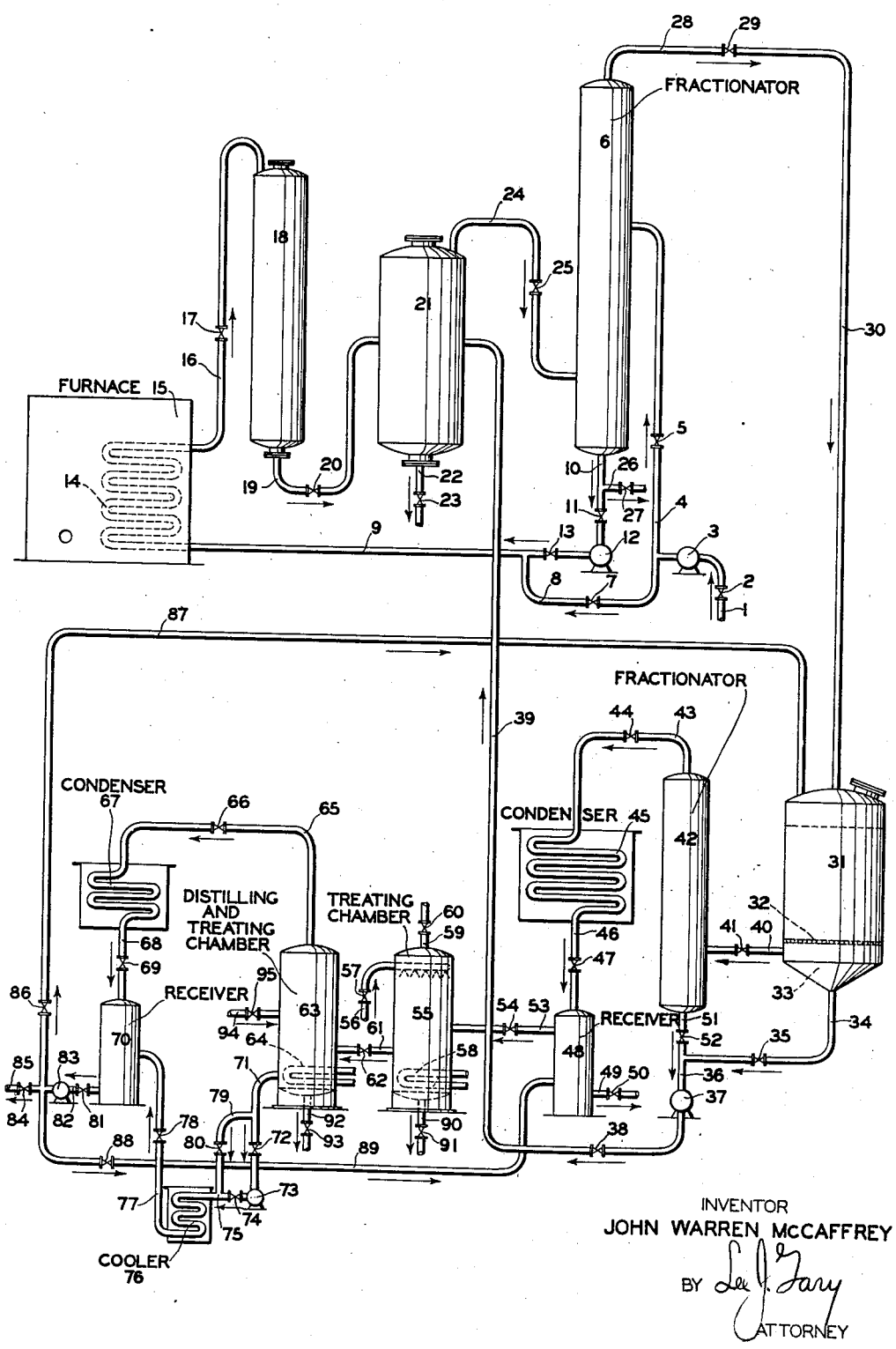
INVENTOR
JOHN WARREN McCAFFREY
BY Lee J. Fary
ATTORNEY Patented May 31, 1938

2,119,110

UNITED STATES PATENT OFFICE 2,119,110

TREATMENT OF HYDROCARBON OILS

John Warren McCaffrey, Chicago, Ill., assignor to Universal Oil Products Company, Chicago, Ill., a corporation of Delaware Application July 10, 1934, Serial No. 734,495

18 Claims. (Cl. 44—9)

This invention relates to the treatment of hydrocarbon gases resulting from the cracking of hydrocarbon oils and the utilization of the products resulting from said treatment for the further refinement and stabilization of the vaporous and liquid products produced in the oil cracking process.

Usual refinery practice is to either burn the gases produced in the cracking plants in the various furnaces around the refinery, or to sell major quantities of it, when there is a market for such as industrial or domestic fuel, or, in the event the gases contain appreciable quantities of recoverable products that might be utilized for more valuable purposes, the gases may be scrubbed or treated and such condensable products recovered while the remaining gas is disposed of as previously stated.

It is the purpose of this invention to provide a self-contained complete oil cracking and treating process wherein the gases resulting from the cracking of petroleum oils are separated from the liquid products produced in the same operation and are converted into additional liquid products which are employed as polymerizing agents for treating the cracked overhead products from the fractionator of the cracking system. A minor portion of the liquid products obtained from the cracked gases may also be added to the final liquid motor fuel product of the process as a stabilizing agent.

A feature of the invention is the conversion of certain constituents of the cracked gases resulting from an oil cracking operation into a mixture of polyhydric alcohols, which in turn, are catalytically converted into a mixture of dioxane and homologs thereof, and the employment of a regulable portion of the mixture of dioxane and its homologs as a polymerizing agent for the hot vaporous products from the fractionator of the cracking system, and the employment of a relatively small amount of the dioxane produced and its homologs as a stabilizing agent for the liquid motor fuel product of the process.

The gases from the receiver of the oil cracking process contain varying amounts of unsaturated hydrocarbons such as ethylene, propylene, butylene, etc. These unsaturated gases may be converted by several methods into mixtures of glycols, for example, they may be reacted with an alkaline solution of potassium permanganate or they may be reacted with hydrogen peroxide. The unsaturated gases by either of these methods may be completely converted to polyhydric alcohols including ethylene glycol, propylene glycol, butylene glycol, etc. The simplest reaction representing the oxidation of the unsaturated gas followed by the absorption of water is shown by the following equation which illustrates the reaction between ethylene and hydrogen peroxide

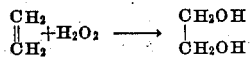

The second step in the conversion of the unsaturated hydrocarbon gases to dioxane and its homologs involves the conversion of the mixture of glycols to a mixture of dioxane and its homologs which may be accomplished in several ways, for example, the glycols may be distilled in the presence of a small amount approximately 4% of concentrated sulphuric acid, and the distilled vapors condensed and collected. Other dehydrating agents suitable for this conversion are phosphoric acid, zinc chloride, aromatic sulphonic acids and bi-sulphates of the alkali metals. The dehydrating step without reference to the catalytic agent employed is represented by the following equation:

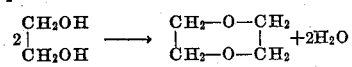

The resulting liquid mixture is permitted to cool and settle whereby the spent and any unused catalytic dehydrating agent settles out in the bottom of the treating chamber and may be withdrawn while the upper clear layer of mixed dioxane and its homologs may be separately withdrawn and further cooled if necessary and employed in any of the manners previously outlined.

The operation of the process of this invention will be better understood following a more detailed description of the different steps involved as indicated in the accompanying diagrammatic drawing which illustrates a conventional oil cracking process of the full-flashing type that enjoys a wide commercial use to which is added the necessary units for converting the gaseous products into a mixture of dioxanes, all or any portion of which may be returned to the treating stage of the combined cracking and treating process. The cracking process represented is not a novel part of the invention and it is to be understood that any other type of cracking process might also be employed in conjunction with the process and apparatus required for this invention. Likewise, any other suitable equipment might be employed for the steps involved in the conversion of the cracked gases to dioxane and the manner and means in which it is employed in the system.

Referring to the drawing, raw oil may be introduced to the system through line 1, valve 2, pump 3, line 4 and valve 5 to an upper section of fractionator 6 or through valve 7 and lines 8 and 9 directly to the heating element of the system, depending upon the character of the oil charged and the amount of cooling desired in the upper portion of fractionator 6. When supplied overhead to fractionator 6 any unvaporized charging oil commingles with reflux condensate produced therein and is withdrawn through line 10 and valve 11 and charged to the heating coil by pump 12 through valve 13 and line 9. In the event the supply of charging oil is fed directly to the coil the same is commingled with reflux from fractionator 6 in line 9.

The combined fresh charging stock and reflux condensate are heated in coil 14, within furnace 15, to the desired conversion temperature, usually ranging from 850 to 950° F., at the outlet of the heating coil, and under a superatmospheric pressure measured at the same point, which may range from 100 to 500 pounds per square inch. Depending upon the products desired and the oil undergoing treatment the conversion conditions may comprise temperatures ranging from 800° to 1200° F., and pressures ranging from substantially atmospheric to 2000 pounds per square inch. The heated products are then passed through line 16 and valve 17 to be discharged into the top of reaction chamber 18 wherein the optimum conversion of the hydrocarbon oils is completed.

The liquid and vaporous products from reaction chamber 18 are withdrawn therefrom in commingled state through an opening in bottom of the chamber and through line 19 and valve 20 to be discharged into vaporizing chamber 21 after pressure reduction through valve 20 to atmospheric or low superatmospheric pressure ranging up to about 100 pounds per square inch. Additional vaporization of oil occurs in the vaporizing chamber and the liquid and vaporous products are separated therein. The liquid residual oils may be withdrawn through line 22 and valve 23 to storage or any other treatment that may be desired, or when it is an object to produce coke in the cracking operation the residual oils may be retained in the vaporizing chamber 21 and be reduced therein to coke.

The vaporous products from chamber 21 are passed through line 24 and valve 25 to fractionator 6 wherein the insufficiently converted materials and products boiling above the desired boiling range of the final liquid product of the process are condensed and returned to the heating coil for further conversion together with the fresh charging stock to the process as previously described. When desired, a regulated portion of the reflux condensate may be withdrawn from the fractionator and from the system to storage or elswhere through lines 10 and 26 and valve 27.

The fractionated vapors of motor fuel boiling range passing overhead from fractionator 6 are delivered by line 28 through valve 29 and line 30 to polymerizing and treating chamber 31 which contains a bed of relatively inert materials. These materials such as pumice stone, crushed firebrick, jackstones, Raschig rings, etc., are supported upon a perforated plate 32 which serves as a false bottom to the treating chamber and permits the separation and collection of treated vapors and condensed polymers in the lower section 33. The polymers may be withdrawn from the lower section of the treating chamber 33 either intermittently or continuously through line 34 and valve 35 and directed through line 36, pump 37, valve 38 and line 39 to the vaporizing chamber 21, wherein sufficient heat is available to revaporize any desirable motor fuel constituents commingled with the polymers.

The treated vapors are withdrawn from the lower section 33 of treating tower 31 through line 40 and valve 41 and introduced to the lower section of fractionator 42 wherein any remaining polymerized material and undesirable fractions are separated from the vapors of desired boiling range which latter pass overhead through line 43 and valve 44 through condenser coil 45, line 46 and valve 47 to receiver 48. Any portion or all of the liquid product separated in receiver 48 may be withdrawn through line 49 and valve 50 for use, storage or further treatment as desired. Any heavy fractions of the treated vapors which are condensed in fractionator 42, or polymers that were not separated out in lower section 33 of treating chamber 31, will be separated from the uncondensed vapors in fractionator 42 and may pass through line 51 and valve 52 to commingle with similar products from the polymerization zone 31 being directed to the vaporizing chamber 21.

The cracked gases which accumulate in the upper part of receiver 48 may be withdrawn through line 53 and valve 54 and discharged into treating chamber 55 wherein the unsaturated gaseous compounds may be treated to produce a mixture of glycols. The chemical treating materials employed for this conversion step for example, hydrogen peroxide, an alkaline solution of potassium permanganate, etc., may be introduced through line 56 and valve 57 to discharge into the treating chamber through a spray or similar means so as to accomplish intimate mixing of the liquid treating materials with the gases introduced thereto. Another method of obtaining the necessary intimate contact between the gases and chemical treating materials that may be employed here is to use inert filling material or provide suitable baffling arrangements not illustrated in treater 55. A coil 58 may be used to supply indirect heat to the resulting liquid products, employing either steam or any other suitable hot vapor or liquid as the heating agent within the coil. Any gases remaining unconverted in chamber 55 or produced by the reaction in this zone can be withdrawn therefrom through line 59 and valve 60 to storage, or further treatment, or use as desired.

The liquid products accumulating in lower section of treating chamber 55 are directed through line 61 and valve 62 to distilling and treating chamber 63 provided with a heating coil 64. As in the case of coil 58 steam, hot vapors or hot liquids may be employed as the indirect heating medium in coil 64. Catalytic materials and/or treating agents, for example, sulphuric acid, phosphoric acid, zinc chloride, etc., may be introduced to chamber 63 through line 94 controlled by valve 95. Any vapors formed in still 63 during the catalytic conversion taking place therein may pass through line 65 and valve 66 to condenser coil 67 passing therefrom through line 68 and valve 69 to collection in receiver 70. In those cases wherein the liquids in chamber 63 are not vaporized but merely heated to promote any reaction therein, the heated liquids may be withdrawn through line 71, valve 72, and directed by pump 73 through valve 74, and line 75 to cooler 76. The cooled liquids under the pressure of pump 73 may be directed from cooling coil 76 through line 77 and valve 78 to receiver 70 or the pump 73 may be by-passed through line 79 and valve 80 if pumping is found unnecessary.

The mixture of dioxane and its homologs that accumulates in receiver 70 may be withdrawn through valve 81 and line 82 by pump 83 and directed therefrom to storage, or for other purposes outside of the present process, through valve 84 and line 85, while any desired portion or all of the mixture may be returned to the polymerizing chamber 31 by pump 83 through valve 86 and line 87 to commingle with the hot vaporous products discharged into the top of polymerizing chamber 31 through line 30. A very small quantity of the mixture of dioxane and its homologs may be commingled with the liquid motor fuel product of the cracking process accumulating in receiver 48 by directing said small portion of the mixture under the pressure of pump 83 through valve 88 and line 89 to the lower section of receiver 48.

Spent treating agents and sludge may be withdrawn from treating chamber 55 through line 90 and valve 91. Likewise, acid sludges and any heavy reaction products may be withdrawn from bottom of chamber 63 through line 92 and valve 93. Materials from both these elements may be regenerated outside the described system for use again in the process of this invention if found desirable to do so.

As previously stated, this invention is not confined to the use of the particular type of cracking process indicated in the accompanying drawing. The drawing shows the combination of a well known oil cracking process of the coil and chamber, full-flashing type, together with necessary equipment for the conversion of the gases produced by the cracking operation into dioxane. Depending upon the operating conditions and the nature of the oil undergoing treatment, the cracking operation may be conducted in the liquid, liquid and vapor or vapor phase. For the purposes of this invention, vapor phase cracking operations are preferred, for the reason that therein larger percentages of unsaturated gases are produced than in either liquid or liquid and vapor phase processes. For example, a liquid vapor phase cracking operation, similar to that illustrated in the drawing, conducted upon a Mid-Continent topped crude, produced the following amounts of unsaturated cracked gases:

| | Percent |
|---|---|
| Ethylene by volume | 4.7 |
| Propylene by volume | 11.6 |
| Butylene by volume | 3.0 |
| Butadiene by volume | 1.9 |

On the other hand, gases from the receivers of vapor phase cracking processes frequently produce as high as 50% unsaturated hydrocarbon gases. The preference for a vapor phase cracking operation is not to be construed, however, as a limitation upon the invention, because regardless of the amounts of unsaturated hydrocarbon gases formed by any cracking process, the same may be converted, by the process herein described, into mixtures of dioxane and its homologs.

The analysis of the gases produced by cracking a Mid-Continent crude oil in a vapor phase operation showed 30.35% ethylene, 12.0% propylene, some butylene and the remainder methane, hydrogen and other gases produced incident to cracking. These gases were removed from the gas separator or ultimate receiver of the process and converted in a treating chamber with an alkaline solution of potassium permanganate to a mixture of polyhydric alcohols. The mixture of alcohols produced thereby were separated from the treating solution and spent reagents and showed upon analysis approximately 60% ethylene glycol, 30% propylene glycol, and some butylene glycol.

The mixture of glycols was heated in a separate still with phosphoric acid present in the ratio of one part of acid to approximately 24 parts of the mixture of glycols. These materials were heated to approximately the boiling point of the mixture by means of a steam coil. After settling and separating the liquid products from the acid sludge produced in the foregoing operation, there was obtained a yield of approximately 80% of a liquid boiling between about 90° and 150° C. This liquid product on analysis proved to be a mixture of dioxane and its homologs, comprising approximately 60% dioxane, 32% dimethyl dioxane, and about 8% diethyl dioxane. It was found unnecessary to separate the mixture of dioxane and its homologs thus produced into specific fractions, because excellent results were obtained by employing not to exceed 10% of the mixture as the polymerizing agent for the vaporous products delivered from the fractionator to the polymerizing zone. Likewise, a small amount of the same mixture when added to the final liquid motor fuel product of the process was found to be an excellent stabilizing agent.

Dioxane is a cyclic double ether and can be appropriately represented by a structural formula having a hexatomic ring.

According to chemical nomenclature and the above structural formula dioxane is diethylene-1.4-dioxide. It melts at 9° C. and boils about 101° C. In contrast to ethylene oxide it forms a number of well defined addition products.

When employed as the sole polymerizing agent for the cracked products coming overhead from the fractionator of a cracking plant usually about 5% of dioxane or of a mixture of dioxane and its homologs comprising dioxane, dimethyl dioxane and diethyl dioxane is sufficient to cause substantially complete polymerization of the gum and color forming constituents present in the distillate. In no case was more than 10% diethylene dioxide required. Still smaller amounts are necessary when used with other polymerizing agents usually employed in refining hydrocarbon oil distillates. In this connection it was found that when employed in very small amounts with other polymerizing agents it acted catalytically, i. e., it increased the rate of polymerization, tended to control the uniform rate of polymerization and caused the reaction to proceed to completeness.

The use of a slight excess of dioxane and its homologs in polymerizing hydrocarbon oil distillates is not harmful because the excess will act like an inhibitor to preserve the qualities of the distillate motor fuel product. This property of dioxane is best shown by the following example. A gasoline obtained by cracking a Pennsylvania fuel oil at a maximum temperature of 940° F., under pressure of approximately 300 pounds per square inch had an induction period of about 40 minutes by the oxygen bomb test and a knock rating of 70 octane number by the motor method. After adding about 0.02% by weight of the dioxane to this gasoline the induction period was raised to approximately 290 minutes while 0.05% of the dioxane raised it to approximately 650 minutes. The anti-knock value of a separate sample of the same gasoline to which 0.05% by weight of dioxane was added remained practically constant during a six month storage test. The octane number by motor method at the end of the sixth month was 68.

I claim as my invention:

1. In a process wherein hydrocarbon oil is subjected to pyrolytic conversion to produce motor fuel and uncondensable gas, the improvement which comprises converting unsaturated components of the gases produced into dioxane and subjecting the motor fuel to a polymerizing treatment in the presence of a regulated quantity of the dioxane to decrease the unsaturated components of the motor fuel.

2. In a process wherein heavy hydrocarbon oil is converted at elevated temperatures and pressures into light hydrocarbon oils, residual liquid and uncondensable gas containing unsaturated components, the improvement which comprises converting the unsaturated components of the gases into dioxane and employing a regulated quantity of the dioxane produced to polymerize the light oil resulting from the oil cracking operation.

3. In a process for the pyrolytic conversion of hydrocarbon oils at temperatures and pressures suitable for producing both motor fuel and gases which gases contain a high percentage of unsaturated compounds, the improvement which comprises converting the unsaturated gaseous compounds into dioxane and its homologs and employing a regulated quantity of said dioxane and its homologs to stabilize the motor fuel product of the process.

4. In a process wherein hydrocarbon oils are subjected to pyrolytic conversion to produce motor fuel and gases, the improvement which comprises chemically converting the olefinic components of the gases into dioxane and its homologs, employing a regulated portion of said dioxane and its homologs to polymerize the olefinic components of the motor fuel resulting from said pyrolytic conversion and employing another regulated portion of said dioxane and its homologs to stabilize said motor fuel.

5. In a process for the pyrolytic conversion of hydrocarbon oils wherein the oil is subjected to conversion conditions of temperature and pressure, the resulting vaporous and non-vaporous products separated, the vapors subjected to fractionation for the removal of their insufficiently converted components, the fractionated vapors subjected to condensation and the resulting distillate and gaseous products recovered and separated, the improvement which comprises subjecting the gases to chemical treatment for the conversion of unsaturated components thereof into dioxane, utilizing a regulated portion of said dioxane to effect polymerization of normally liquid unsaturated components of the vaporous products of the process and employing another regulated portion of the dioxane as a stabilizing agent to prevent deterioration of said distillate.

6. In a process for the pyrolytic conversion of hydrocarbon oils wherein the oil is subjected to conversion conditions of temperature and pressure, resulting vaporous and non-vaporous products separated, the vapors subjected to fractionation for the removal of their insufficiently converted components, the fractionated vapors subjected to polymerization for the conversion of normally liquid unsaturated components of the vaporous products into saturated compounds, the resulting vaporous products subjected to condensation by cooling and the resulting distillate and gaseous products recovered and separated, the improvement which comprises subjecting the gases to chemical treatment for the conversion of unsaturated components thereof into dioxane, recovering the dioxane, returning a regulated portion thereof to the polymerizing step as a polymerizing agent and commingling another regulated portion of the dioxane with said distillate product.

7. In the cracking of hydrocarbon oil for the production of gasoline and wherein the gasoline is separated as condensate from olefinic gas formed by the cracking, the method which comprises producing a mixture of dioxane and homologs thereof from said gas and adding a sufficient quantity thereof to the gasoline condensate to stabilize the latter against deterioration.

8. In the cracking of hydrocarbon oils wherein there is produced a vapor-gas mixture containing gasoline and olefinic gases, the method which comprises subjecting the mixture to a polymerizing treatment to refine the gasoline, separating the gases from the gasoline and producing therefrom a mixture of dioxane and homologs thereof, and supplying at least a portion of the mixture thus formed to the polymerizing treatment as a polymerizing agent therein.

9. In the cracking of hydrocarbon oils wherein there is produced a vapor-gas mixture containing gasoline and olefinic gases, the method which comprises subjecting the mixture to a polymerizing treatment to refine the gasoline, separating the gases from the gasoline and producing therefrom a mixture of dioxane and homologs thereof, and supplying at least a portion of the mixture thus formed to the polymerizing treatment as a polymerizing agent therein and adding another portion thereof to the separated gasoline as a stabilizer for the latter.

10. A method for refining cracked gasoline distillate which comprises treating the distillate with a mixture of dioxane and homologs thereof.

11. A method for refining cracked gasoline distillate which comprises treating the distillate with dioxane.

12. A method for refining cracked gasoline distillate which comprises treating the distillate with a cyclic double ether of the character of dioxane.

13. A method for producing stabilized motor fuel which comprises subjecting cracked gasoline to the refining action of a mixture of dioxane and homologs thereof, and incorporating into the gasoline, as a permanent ingredient thereof, a sufficient quantity of said mixture to prevent or substantially reduce deterioration of the gasoline.

14. Motor fuel comprising cracked hydrocarbon distillate containing a relatively small amount of a cyclic double ether of the character of dioxane.

15. Motor fuel comprising cracked hydrocarbon distillate containing a relatively small amount of dioxane.

16. Motor fuel comprising cracked hydrocarbon distillate containing a relatively small amount of a mixture of dioxane and homologs thereof.

17. Motor fuel comprising gasoline containing as an improver a small amount of dioxane.

18. A method for improving gasoline which comprises adding a small amount of dioxane thereto.

JOHN WARREN McCAFFREY.